United States Patent Office 3,606,707
Patented Sept. 21, 1971

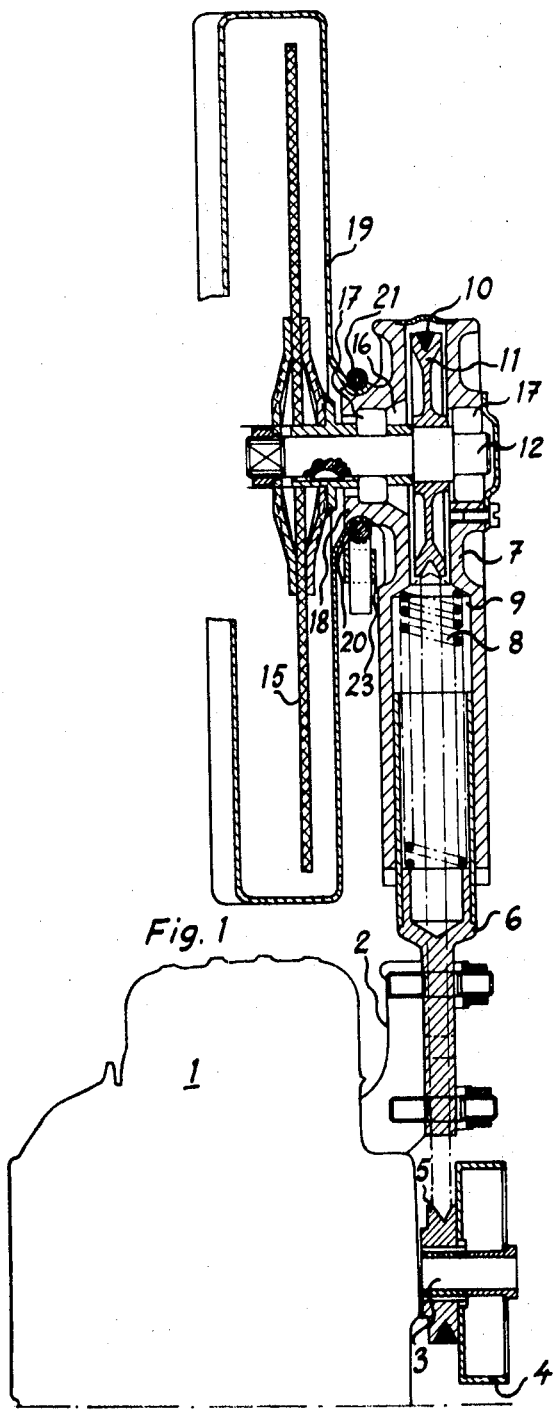

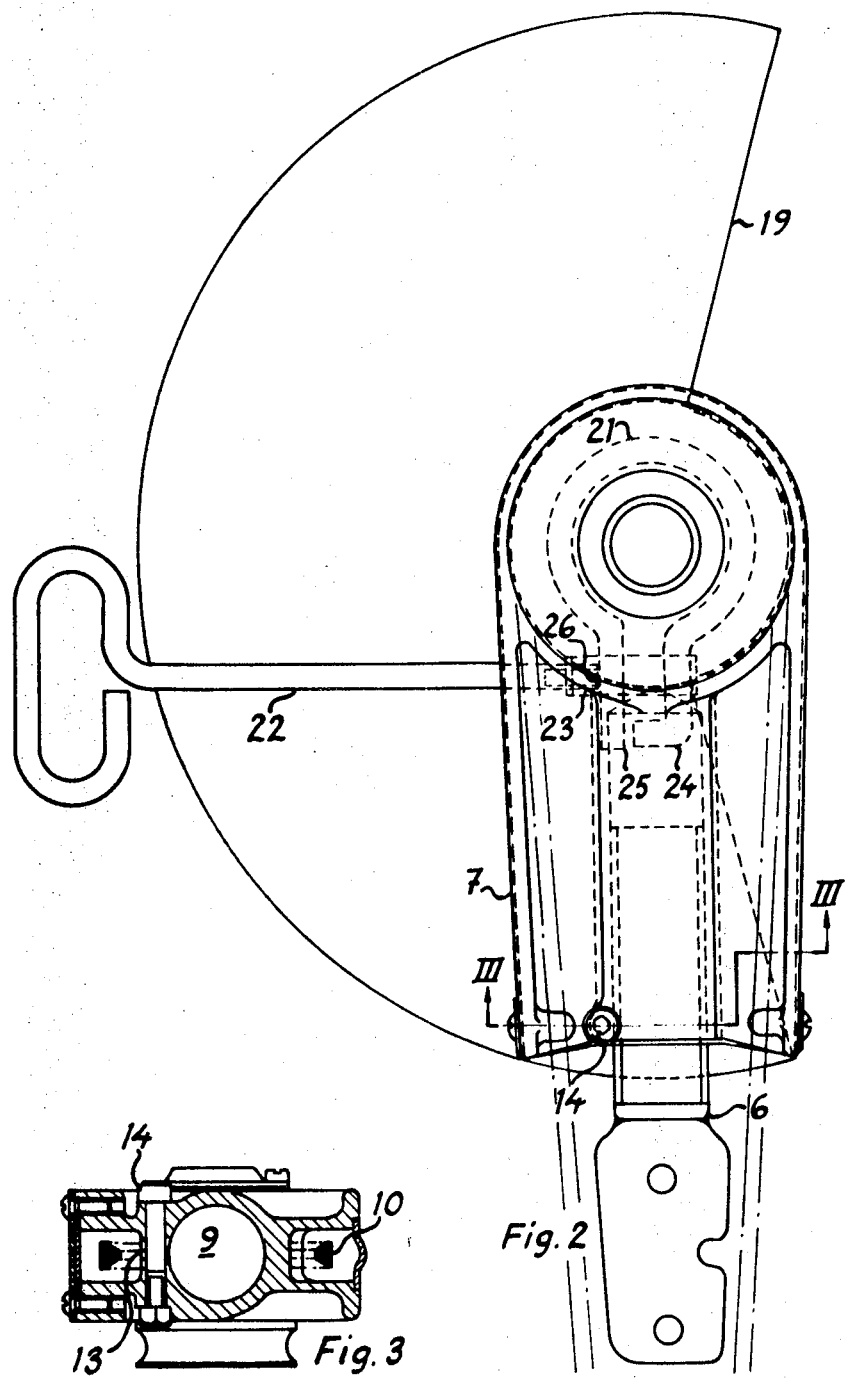

3,606,707
ARRANGEMENT AT AN ENGINE CHAIN SAW FOR MOUNTING A CIRCULAR CUTTING TOOL TO THE FRAME OF CHAIN SAW
Ulf Vilhelm Naslund, Huskvarna, Sweden, assignor to Husqvarna Vapenfabriks Aktiebolag, Huskvarna, Sweden
Filed Jan. 17, 1969, Ser. No. 792,085
Claims priority, application Sweden, Jan. 18, 1968, 691/1968
Int. Cl. B24b 19/00
U.S. Cl. 51—241
4 Claims

ABSTRACT OF THE DISCLOSURE

There is provided a device in motor saws by which a circular shaped cutting tool can be attached to the frame of said saw; said device including an arm which projects outwardly from the frame and which carries a shaft driven by the motor and forming the rotary shaft of the cutting tool; and in which the rotary shaft of the tool is journaled perpendicularly to the arm in a bearing capable of being turned round the longitudinal direction of the arm, and supplied with a locking device, and wherein the rotary shaft can be adjusted to and locked in any angular position, in a plane through the bearing perpendicular to the arm, and wherein a cover plate arranged concentrically to the rotary shaft and at least partly enclosing the tool is capable of being rotated perpendicularly to the rotary shaft and is provided with a locking device.

---

The present invention is concerned with a device for mounting a circular-shaped cutting tool to the frame of a motor saw; said device being provided with an arm which extends outwardly from the frame and on which a shaft driven by the motor is mounted; said shaft being the rotation shaft of the cutting tool.

In situations when electrically operated tools cannot be used because no electricity is available there arises a need of implements operated by internal combustion engines. An expedient operating source for the implements in such situations is the motor unit of a motor saw, to which a tool suitable for the work on hand can be attached.

It is known to use such a motor saw in which the saw blade is replaced by an auxiliary cutting implement, consisting of an arm mounted on the motor unit and provided with a bearing and a shaft for a rotary tool, e.g. an emery-wheel, for cutting tin. In known constructions of such motor saws the bearing is fixedly mounted on the arm, and consequently the position of the tool in relation to the arm cannot be varied. In certain circumstances, however, it is necessary that the tool can be moved between various positions in relation to the arm. An improvement to earlier motor saws, would therefore be obtained if the bearing on the arm was arranged so that it could rotate about a shaft which extends longitudinally to the arm, so that said tool could be turned to different positions around the arm. A tool which is to be used for cutting or sawing purposes must be protected by a cover plate or the like, the position of which plate must be capable of adjustment to the point of contact of the tool with the work piece. In the case of a saw provided with a rotary tool shaft bearing it is most essential, that the cover plate can be adjusted positionally, since said plate is liable to adopt unfavourable positions when the bearing is rotated to a great extent.

The problem of improving known motor saws of the type discussed by rendering the tool more flexible in relation to the arm, and thereby attend to the necessity of adjusting the cover, is solved by the present invention in that the rotary shaft of the tool is journaled perpendicularly to the arm in a bearing capable of being turned round the longitudinal direction of the arm, and supplied with a locking device, and wherein the rotary shaft can be adjusted to and locked in any angular position, in a plane through the bearing perpendicular to the arm and wherein a cover plate arranged concentrically to the rotary shaft and at least partly enclosing the tool is capable of being rotated perpendicularly to the rotary shaft and is provided with a locking device.

An example of an embodiment of a device according to the invention is described in the following with reference to the accompanying drawing, wherein:

FIG. 1 shows a longitudinal section through the whole device, provided with an emery-wheel, FIG. 2 is a side elevation of the device and FIG. 3 is a section through the arm of the device along the line III—III in FIG. 2.

FIG. 1 shows the outline of the motor frame 1, on which is arranged an attachment 2 for the implement or tool, to be mounted on the frame. The driving shaft 3 of the motor unit is provided with a centrifugal coupling or clutch 4, between the free end of the shaft and V-belt drive 5 journaled on the shaft. The coupling has the known function of connecting the belt drive to the shaft only when the speed of said shaft exceeds a certain minimum value, which corresponds approximately to the idling speed of the motor. Mounted on the attachment 2 is an arm, comprising two, telescopically composed inner and outer portions 6 and 7 respectively. Located within the inner arm portion 6 is a coil spring 8 which presses against the bottom of a cylindrical cavity 9 in the outer arm portion 7. The purpose of the coil spring 8 is to clamp a V-belt 10, which extends between the drive 5 and a V-belt wheel 11 mounted on a journaled shaft 12 in the outer arm portion 7. The V-belt forms a transmission between the drive shaft 3 and the shaft 12 which is driven at a certain transmission ratio in relation to the drive shaft. It is possible, by compressing the arm portions 6 and 7 together to relieve the tension on the belt to such an extent that said belt can be passed over the coupling 4, whereupon the arm portions 6 and 7 can be separated. When reassembling the arm 6, 7 the arm portion 7 is passed towards the arm portion 6, so that the belt can be passed back over the coupling.

When the saw is to be used, the arm portions 6, 7 must be locked together, for which purpose a locking device such as that illustrated in FIG. 3 can be used. In the wall of the cavity 9 there is disposed a longitudinally extending slot 13, the width of which can be reduced by means of screw 14 above said slot. When the screw is tightened the portion in which the cavity is located is clamped harder about the portion 6, and the arm portions are thus immovable in relation to each other.

The bearing in which shaft 12 is journaled is shown in FIG. 1, which also shows an emery-wheel 15 fitted to the shaft. The bearing is constructed as a bearing housing 16, in which in addition to two bearings 17 for the shaft 12 the V-belt wheel 11 is also mounted. On one side of the bearing housing there is a flange 18, on which a protective cover plate 19 is fixed by means of a circular attachment 20 around the flange. The attachment 20 can be tightened about the flange 18 by means of an annular clamp 21, joined to the attachment by means of a screw, rendering the attachment 20 immovable in relation to the flange. The construction of the clamp 21 can be seen in FIG. 2, shown seated behind the bearing housing 16. A tommy bar or handle 22, easily reached during operation of the saw, is screwed at its inner end into a threaded hole in a long and narrow stirrup 23 which embraces two free ends 24, 25 of the annular clamp 21. The one end 24 is bent about the other so that said ends contact each other when the tommy bar is screwed inwards and its end 26 acts against the bent end 24. Further rotation of the bar 22 hardens the grip about the flange, to firmly fix the protective cover plate in position.

As will be evident from the aforegoing, the tool, in the exemplary embodiment an emery wheel, can be adjusted to any position about the longitudinal axis of the arm. In general, however, only two positions are used; these being, the position shown in FIG. 2 and the opposite position, as viewed as a mirrored image of the first mentioned position, when the wheel is located to the right of the arm. In this latter position, the saw is very useful for cutting seams close into walls, at the base or in corners thereof.

It should be understood that the invention is not restricted to what has been described and illustrated. For instance, the belt transmission can be replaced by, for example, a journaled shaft between the motor unit and the tool shaft. Furthermore, different sized portions of the arm can form the movable part which renders the bearing rotatable, and similarly the locking arrangement for the bearing housing can also be modified at random within the scope of the following claims.

What is claimed is:

1. A device for mounting a circular-shaped cutting tool to the frame of a motor saw, the device including an arm which extends outwardly from the frame and in which is journaled a shaft driven by the motor and forming the shaft of rotation of the cutting tool, wherein the rotary shaft of the tool is journaled perpendicularly to the arm in a bearing housing capable of being turned around the longitudinal axis of the arm, and supplied with a releasable locking device, and wherein the rotory shaft can be adjusted to and releasably locked in any angular position, in a plane through the bearing housing perpendicular to the arm, and wherein a cover plate arranged concentrically to the rotary shaft and at least partly enclosing the tool is capable of being rotated perpendicularly to the rotary shaft and is provided with a locking device.

2. The device as claimed in claim 1 and said arms comprising two telescopically arranged arm portions, said portions being rotatable relative to each other and comprising an inner portion attached to said frame and an outer portion, said bearing housing being arranged on said outer portion and said first locking device releasably coupling said portions together in adjusted positions.

3. The device as claimed in claim 2 and further including a transmission means adapted to transmit driving power from said motor to said rotary shaft, said transmission means comprising a belt receiving pulley carried by said rotary shaft, a second belt receiving pulley carried by said frame, a drive belt trained over and between said pulleys, spring means biased between said arm portions and normally urging said portions apart to tension said drive belt between said pulleys, and said first locking device being operable in released condition to permit relative movement of said arm portions toward one another sufficient to relieve tension on said drive belt, to permit removal of said drive belt from said second pulley and rotary adjustment of said outer arm portion relative to said inner arm portion.

4. The device as claimed in claim 1 and said bearing housing including a flange arranged concentrically of said rotary shaft, a circular fitting carried by said protective cover plate, said fitting being arranged around said flange and said second locking device being cooperatively arranged about said fitting and operative to releasably clamp said fitting to said flange.

References Cited

UNITED STATES PATENTS

| | | | |
|---|---|---|---|
| 1,785,055 | 12/1930 | Strand | 51—170 |
| 1,939,674 | 12/1933 | Elskamp | 51—99 |
| 2,498,951 | 2/1950 | Froese | 51—268 |
| 2,547,057 | 4/1951 | Stieglitz | 51—170.2 |
| 2,792,724 | 5/1957 | Durall | 76—25A |
| 2,972,344 | 2/1961 | Bergen | 51—99 |
| 3,020,783 | 2/1962 | Hill | 76—25A |
| 3,191,349 | 6/1965 | Huhn | 51—241 |
| 3,449,868 | 6/1969 | Leveque | 51—170 |

WILLIAM R. ARMSTRONG, Primary Examiner

U.S. Cl. X.R.

51—170, 268